May 23, 1961 M. LEVECQUE ET AL 2,984,864
METHOD OF AND APPARATUS FOR PRODUCING
FIBERS AND THIN MATERIAL
Filed Feb. 12, 1959 2 Sheets-Sheet 1
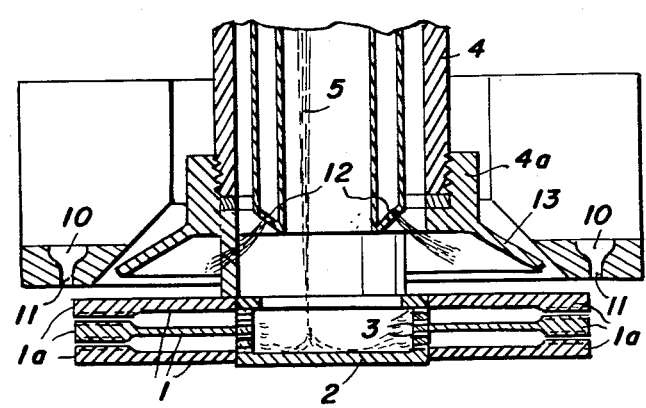
FIG. 1
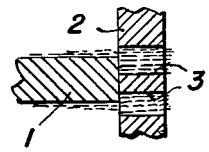
FIG. 1a
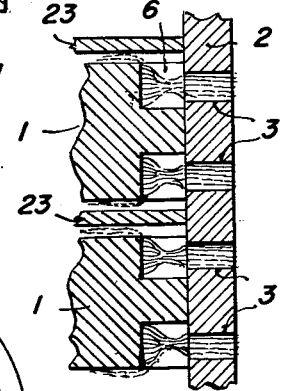
FIG. 1b
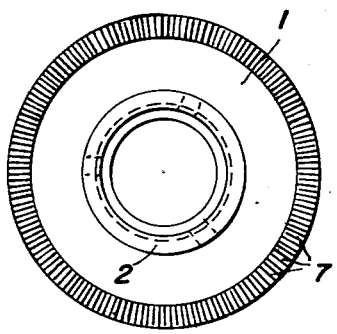
FIG. 2
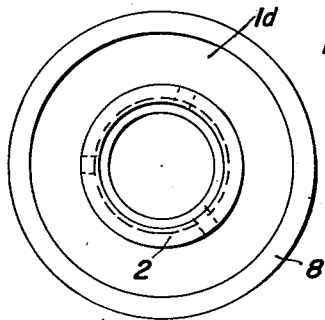
FIG. 3
FIG. 5
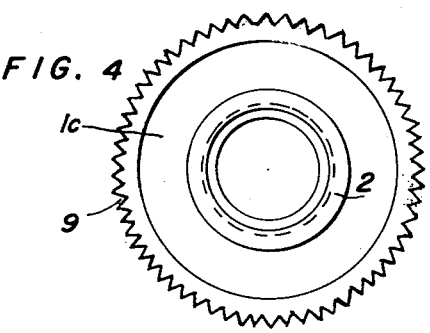
FIG. 4
FIG. 6
FIG. 7
INVENTORS
Marcel Levecque
and Marcel Mabru
BY Albert R. Frey
ATTORNEY May 23, 1961 M. LEVECQUE ET AL 2,984,864
METHOD OF AND APPARATUS FOR PRODUCING
FIBERS AND THIN MATERIAL
Filed Feb. 12, 1959 2 Sheets-Sheet 2
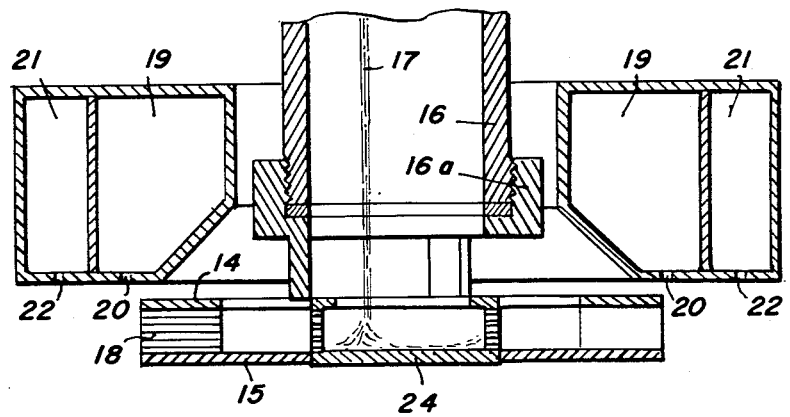
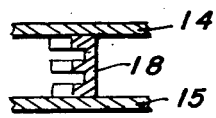
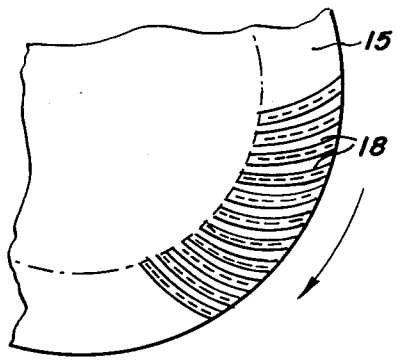
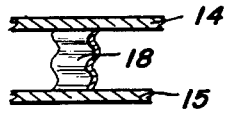
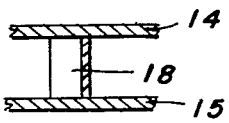
INVENTORS
Marcel Levecque
and Marcel Mabru
BY
ATTORNEY

United States Patent Office 2,984,864
Patented May 23, 1961

2,984,864

METHOD OF AND APPARATUS FOR PRODUCING FIBERS AND THIN MATERIAL

Marcel Levecque, Saint-Gratien, and Marcel Mabru, Paris, France, assignors to Societe Anonyme des Manufactures des Glaces et Produits Chimiques de Saint-Gobain, Chauny & Cirey, Paris, France, a corporation of France Filed Feb. 12, 1959, Ser. No. 792,855

Claims priority, application France Feb. 15, 1958

30 Claims. (Cl. 18—2.5)

The present invention relates to the manufacture of fibers from mineral or organic materials in the viscous state, and in particular glass fibers.

It refers more particularly to a method wherein the material in the viscous state is supplied or delivered to the interior of a body or centrifuge which is rotatable at high speed about its axis, and which projects said material in the form of threads or fibers.

The invention contemplates the delivery of a supply stream of viscous material to the interior of a distributor or receptacle having a peripheral wall containing a plurality of orifices, preferably arranged in superposed rows. Upon rotation at high speed, for example 2600 to 3000 r.p.m., the distributor will project the collected viscous material so as to distribute it over a surface or a plurality of surfaces on one or more plates turning about the same axis, and surrounding the distributor. The projected material is guided and supported on these surfaces of the plates in such a manner as to assure its separation in a substantially homogeneous manner over the whole periphery of said surfaces, so that each of the surfaces projects simultaneously from the whole of its periphery all the material which has there been separated, this projection taking place in the form of fibers uniformly surrounding the axis of rotation.

According to one method of practicing the method herein disclosed, the surfaces of one or more of the plates are supplied with the material independently of one another.

This supplying can be advantageously obtained by means of one or several distributors placed coaxially or substantially coaxially with respect to the rotatable plates. When more than one rotatable plate is used, they may be superposed. The diameters of these plates can be different, for example, progressive, or in certain cases, of the same diameter. These plates can be smooth, or be provided with grooves, waves, or roughness at their periphery, such as points, facilitating the projection of the melted material in the form of fibers.

In those cases where the material is projected to one or more surfaces of the rotatable plates, the plate or plates will be mounted outside of and coaxially to the distributor and affixed thereto or integral therewith and rotate with the distributor.

It is advantageous to construct the distributor in the form of a hollow receiver or receptacle having at its periphery orifices or channels, moving along in rotation with the plates, and from which the material is projected under centrifugal force through and from the orifices or channels and into contact with the plates and for support thereby. The orifices of the distributor are divided between the different plates in such a way as to obtain a separation of and good distribution of the material upon the plates. Good results are obtained with several rows of orifices placed in the form of a quincunx and by providing two rows of orifices between two superposed plates.

The invention herein disclosed permits a certain number of advantageous results to be obtained. For example, it allows for the utilization of very hot glass, notably at a temperature above that which can be used with methods wherein the material undergoing treatment is projected from orifices placed at the periphery of an ordinary turning body or centrifuge. In the invention herein disclosed, the material, such as glass, can, in fact, be brought to any desired temperature sufficient for centrifuging without risking deterioration of the distributor and the rotatable plates. It also appears that the method and apparatus avoid draw backs due to devitrification. In fact, if a devitrification tends to start on a plate, centrifugal force causes an evacuation of the crystals when they reach a certain size.

Hereinafter are described, by way of non-limiting examples, several forms of realization of device for practicing the method according to the invention.

Reference will now be had to the accompanying drawings, wherein corresponding parts are identified by corresponding marks of reference and wherein:

Fig. 1 is a vertical section through the apparatus, showing the relation of the centrifuging body which includes the distributor and the plates, the combustion chamber and the feed of the viscous material to the centrifuge.

Fig. 1a is an enlarged fragmentary view showing orifices in the distributor each discharging or projecting viscous material directly to a complementary surface of the plate.

Fig. 1b is a view, somewhat similar to Fig. 1a, showing the distribution of viscous material to opposite sides of two plates.

Fig. 2 is a plan view of a plate having a serrated portion at its peripheral wall for the production of fibers.

Fig. 3 is a view similar to Fig. 2 showing a plate having a smooth surface at its peripheral wall which may be used for the production of pellicles or films.

Fig. 4 shows a plate with a serrated or grooved periphery.

Figs. 5, 6 and 7 are diagrammatic views showing the use of superposed centrifuging plates of different and increasing diameters.

Fig. 8 is a vertical section of a modified form of apparatus showing in the main the centrifuge, combustion chamber and blower unit.

Figs. 8a, 8b and 8c are fragmentary views of different forms of channels or guideways which may be used between the plates of Fig. 8 at the periphery thereof.

Fig. 9 is a fragmentary plan view showing the use of curved blades to establish curved channels between the plates at the periphery thereof.

In the form of realization shown in Fig. 1, the device comprises coaxial tiered plates 1; three are shown in this example. These plates are fashioned so as to be separated from one another and are affixed to or integral with a receptacle or distributor 2 placed radially inward of said plates and along their coincident axes. The distributor 2 is shown in the form of a cylindrical receptacle open at the top and provided with a plurality of rows of orifices 3 in its peripheral wall. The plates 1 and the distributor 2 constitute as a whole a rotatable body or centrifuge which is integral with or affixed to a ring 4a which in turn is affixed to and supported by the sleeve 4 through which the parts are rotated at sufficient speed by any suitable means, not shown. The viscous material, such as molten glass 5 from a suitable source, not shown, falls into the distributor 2 where, due to its rapid rotation, it forms a thin layer on the interior wall of the distributor supplying orifices 3 and from which it is projected directly to the plates due to the rapid rotation of the distributor.

As shown, it is advantageous to provide two rows of orifices 3 at intervals between the plates 1 so that the material projected through said orifices takes the form of a thin layer on the surfaces of the plates and advances from the interior toward the exterior to arrive at the periphery 1a of the plates whence the material is projected in the form of fibers.

Fig. 1a shows a desirable arrangement wherein the axis of the projection orifices 3 is substantially at the level or plane of the surfaces of the plate corresponding to said orifices. The material thus readily forms a thin coating passing over the surface of each plate.

One can also, as shown in Fig. 1b, provide in the plates circular drains or catch-basins 6 into which the orifices 3 of the distributor empty, the viscous material passing from these drains onto the surfaces of the plates as shown. Circular separators 23 can be provided, placed between plates 1, to facilitate guiding the material projected from orifices 3 of the distributor 2 and moving outwardly on the plates 1.

It will be noticed from Figs. 1a and 1b that the plates maintain definite separation of the viscous material discharged from the orifices of the distributor.

The periphery of plate 1 can advantageously carry small notches or radial channels 7 which will facilitate the formation of fibers, as shown in Fig. 2. The plate 1c shown in Fig. 4 may have teeth 9 on the periphery thereof as an alternative to the radial notches for channel 7 in Fig. 2. The plate 1d in Fig. 3 may have a smooth part 8, as an aid in the formation of thin films or pellicles.

The apparatus above described can be integrated with suitable devices for the heating of the peripheral parts of the plates, as well as the heating of the exterior zone surrounding these parts. It can likewise employ means for assuring the drawing out of the fibers. For example, and as shown in Fig. 1, the invention can usefully employ an annular combustion chamber 10 coaxial with the turning body or centrifuge provided with an annular slot 11 through which issue the flames or hot gases acting on the periphery of the plates and the material issuing therefrom to draw out the same. This combustion chamber can also be used to heat the exterior zone next to the plates. An annular burner 12 is provided with suitable openings or nozzles for the projection of flames or hot gases upon the centrifuge to assure its proper and desired heating. An annular deflector 13 may be employed to arrest undue dispersion of the flames or hot gases.

Plates 1 can all have the same diameter or different diameters and in the latter instance varying from the upper plate to the lower plate. In the latter case, the peripheral walls 1e of the plates 1f may be inclined and lie along a common inclined straight line as shown in Fig. 5, or the inclined peripheral walls 1g of the plates 1h may be stepped at increasing diameters in a downward direction as shown in Fig. 6. Alternatively, the peripheral walls 1k of the plates 1m may extend perpendicularly to the planes of the latter and may be arranged in stepped fashion as shown in Fig. 7.

In the form of invention depicted in Figs. 8 and 9, the apparatus is shown with two plates 14 and 15, the upper plate 14 being integral with or affixed to ring 16a which in turn is affixed to tube 16, the latter being open to permit passage of the supply stream of viscous material 17. Between these plates a receptacle or distributor 24 is placed which can, for example, be analogous to that of Fig. 1. Inwardly curving blades 18 may be placed between the two plates adjacent the periphery thereof and disposed according to the direction of rotation of the plates as indicated by the arrow, Fig. 9. The material conducted over these blades is projected from the centrifuge in the form of films or fibers.

The blades 18 can have grooves (Fig. 8a) or undulations (Fig. 8b) in a direction parallel to the plates. They can also be smooth (Fig. 8c).

As shown in Fig. 8, a burner 19 with a substantially continuous slot or orifices 20, close together, can be provided coaxially of the turning body or centrifuge, through which flow the jets of fluid at high temperature or flames directed to contact with the peripheral part of the turning body or centrifuge over its entire height. Blower elements 21 can also be provided, the currents of fluid leaving these elements in a downward direction through an appropriate slot or slots 22 drawing out or attenuating the fibers in their propagation. As shown and described, these devices can be integrated with the centrifuge as to insure the projection toward and contact with the peripheral zone of the turning body or centrifuge of a high temperature fluid or flames affecting the whole height of the peripheral surface from which the material is projected. The fluid at high temperature or the flames can accompany the fibers in their propagation, the fibers thus remaining within the high temperature fluid during their attenuation or drawing-out.

The temperature of the periphery of the centrifuge can be regulated by the action of heating or cooling medium so as to give it a temperature independent of that of the supply material and of the surrounding atmosphere. These means of heating can produce a uniform effect over the entire height of the projection surface or an effect which differs according to the considered level. The heating can be assured through passing an electric current into the turning elements or by induced currents or even by radiation of these elements.

In order to make a gaseous current, of practically homogeneous temperature and speed equal at all points in this heating zone act on the fibers, a conduit can be provided which channels the gas current from its emission orifice up to the upper level of the first or top plate by permitting its expansion and spread protected from all disturbing currents, and then, in an annular zone of constant section surrounding the whole of the periphery of all of the plates 1. Means of cooling can be provided at the outlet of this zone to assure tempering of the fibers.

It will be understood that the distributor 2 can be formed differently from that herein shown. It can have, for example, a conic projection organ or a certain number of horizontal or inclined projection surfaces as disclosed in the U.S. pending application of Levecque and Piot Ser. No. 567,024.

The devices which have been described are more specially designed to obtain fibers; they may likewise be used to manufacture pellicles or films, notably by tilting of the turning elements at the smooth periphery as shown in Fig. 3.

What is claimed is:

1. The method of producing fibers from viscous material, and particularly glass fibers, which includes collecting a mass of viscous material from a supply body, moving said mass under the action of centrifugal force radially outward and separating the same into rows of outwardly moving fibers, continuing the outward movement of the rows of fibers under said force and concomittantly and separately supporting mechanically each of the rows of fibers, and continuously giving support to each of the rows of fibers uninterruptedly in both radial and circumferential direction, from the time of their initial formation until the time of their final discharge.

2. The method of producing fibers from viscous material, and particularly glass fibers, which includes delivering a supply of viscous material to the interior of a hollow distributor provided with a plurality of rows of orifices in its peripheral wall, rotating the receptacle at centrifuging speed to project the viscous material outwardly through the said orifices in the form of fibers, continuously supporting and guiding the fibers during their outward movement by delivering the fibers as they issue from said orifices onto at least one surface of a rapidly rotating annular plate abutting the peripheral wall of the distributor adjacent the orifices therein and rotating with the same, continuing the outward movement of the fibers to the periphery of the plate, and discharging the fibers therefrom.

3. The method of producing fibers from viscous materials, and particularly glass fibers, which includes delivering a supply of viscous material to the interior of a hollow distributor provided with a plurality of rows of orifices in its peripheral wall, rotating the receptacle at centrifuging speed to project the viscous material outwardly through the said orifices in the form of fibers, continuously supporting and guiding the fibers during their outward movement by delivering the fibers as they issue from said orifices onto at least one surface of each of a plurality of spaced and independent rapidly rotating annular plates, each abutting the peripheral wall of the distributor adjacent the spaced orifices therein and rotating with the same, continuing the outward movement of the fibers to the periphery of the plates, and discharging the fibers therefrom.

4. The method set forth in claim 1 wherein the fibers at the time of final discharge are subjected to a gaseous blast to draw out and attenuate the same.

5. The invention set forth in claim 3 wherein the fibers discharged from the periphery of the plates are entrained in an annular blast of gases to draw out and attenuate the same.

6. The invention set forth in claim 3 wherein the peripheral portions of the plates are heated to assure continuous discharge of the fibers.

7. The invention set forth in claim 3 wherein the fibers are projected through curved channels in the peripheral portions of the plates incident to their final discharge from the plates.

8. The method set forth in claim 3 wherein the fibers are delivered from the distributor directly to opposite surfaces of each of the spaced and independent plates.

9. In apparatus for forming fibers from viscous material, and particularly glass fibers, the combination of a rotatable distributor adapted to receive a supply of viscous material and having a peripheral wall provided with a plurality of rows of orifices therein for the projection of the material upon the rotation of the distributor at centrifuging speed, at least one annular plate abutting said distributor and extending radially outward therefrom and rotatably at the same speed as said distributor, said plate having its surfaces positioned and arranged so as to intercept, receive and continuously give support to the viscous material as it is discharged from the adjacent orifices of said distributor, said plate terminating in a peripheral portion shaped for the discharge of the viscous material.

10. In apparatus for forming fibers from viscous material, and particularly glass fibers, the combination of a rotatable distributor adapted to receive a supply of viscous material and having a peripheral wall provided with a plurality of rows of orifices therein for the projection of the material upon the rotation of the distributor at centrifuging speed, a plurality of annular plates abutting and connected to said distributor and extending radially outward therefrom and rotatable at the same speed as said distributor, said plates being arranged in tiers and separate and independent of each other with the surfaces of each plate so positioned and arranged as to intercept, receive and continuously give support to the viscous material as it is discharged from the adjacent orifices of said distributor, said plates terminating in a peripheral portion shaped for the discharge of the viscous material.

11. The invention set forth in claim 10 wherein an annular combustion chamber provided with a discharge opening directs hot gases upon the periphery of each plate and the fibers issuing therefrom.

12. The invention set forth in claim 10 wherein an annular blowing unit above said plates provides a blast of gaseous fluid for the entrainment and attenuation of the fibers discharged from said plates.

13. The invention set forth in claim 10 wherein each plate is so constructed and arranged that its inner face abutting the peripheral wall of the distributor is positioned between successive rows of orifices in the distributor with the opposite surfaces of the plate exposed to said successive rows of orifices.

14. The invention set forth in claim 13 wherein the opposite surfaces of each plate are substantially aligned with complementary rows of orifices in said distributor.

15. The invention set forth in claim 10 wherein the inner edge of each plate is recessed to provided pockets opposite successive rows of orifices in the distributor whereby to receive directly the viscous material projected from said orifices.

16. The invention set forth in claim 15 wherein annular partitions are interposed between the spaced plates and out of contact therewith.

17. The invention set forth in claim 10 wherein the diameters of the plates vary progressively from the top plate to the bottom plate.

18. The invention set forth in claim 10 wherein the peripheral portions of the surfaces of each plate are serrated in a plane substantially normal to the axis of rotation of the plates.

19. The invention set forth in claim 10 wherein the peripheral portions of the surfaces of each plate are serrated in a plane substantially parallel to the axis of rotation of the plates.

20. The invention set forth in claim 10 wherein the peripheral portions of the surfaces of the plates are smooth, substantially parallel to each other and arranged in a plane normal to the axis of rotation of the plates.

21. The invention set forth in claim 10 wherein curved blades are interposed between the separated plates at their peripheral portions.

22. The invention set forth in claim 21 wherein the blades are provided with channels.

23. The invention set forth in claim 21 wherein the developing axes of the curved blades are off center with respect to the axis of the plates with the curved blades projecting in a direction away from the direction of rotation of the plates.

24. In apparatus for forming fibers from viscous material, and particularly glass fibers, the combination of a rotatable distributor adapted to receive a supply of viscous material and having a peripheral wall provided with a plurality of rows of orifices therein for the projection of the material upon the rotation of the distributor at centrifuging speed, a plurality of annular plates abutting and connected to said distributor and extending radially outward therefrom and rotatable at the same speed as said distributor, said plates being arranged in tiers and separate and independent of each other with the surfaces of each plate so positioned and arranged as to intercept, receive and continuously give support to the viscous material as it is discharged from the adjacent orifices of said distributor, said plates terminating in peripheral portions so constructed and arranged as to impart the desired shape to the viscous material in the course of its discharge from said plates.

25. The method of producing fibers and thin material from viscous material and particularly glass fibers, which includes delivering a supply of viscous material to a distributing organ, rotating said organ at centrifuging speed to project the viscous material outwardly in a divided state, intercepting, receiving and continuously supporting mechanically said material, uninterruptedly in both radial and circumferential directions, on rotating elements surrounding entirely the distributing organ, and projecting said material simultaneously from the whole periphery of each of these elements.

26. The method of producing fibers from viscous material and particularly glass fibers, which includes delivering a supply of viscous material to a distributing organ, rotating said organ at centrifuging speed to project the viscous material outwardly, at a plurality of levels, from this organ, in a divided state, intercepting, receiving and continuously supporting mechanically at different levels said material on annular rotary elements surrounding entirely the distributing organ so as to obtain a practically homogeneous distribution of the molten material on all the periphery of said elements, and projecting at each of said different levels said material simultaneously from the whole periphery of each of these elements in the form of fibers.

27. The method of producing fibers from viscous material, and particularly glass fibers, which includes delivering a supply of viscous material to the interior of a hollow receptacle provided with a plurality of rows of orifices in its peripheral wall, rotating the receptacle at centrifuging speed to project the viscous material outwardly at a plurality of levels through the said orifices in a finely divided state, intercepting, receiving and continuously supporting mechanically at different levels said material on annular rotary elements surrounding entirely the receptacle so as to obtain a substantially uniform distribution of the molten material on all the periphery of said elements, and projecting at each of said different levels said material simultaneously from the whole periphery of each of these elements in the form of fibers.

28. In apparatus for producing fibers and thin material from viscous material, and particularly glass fibers, the combination of a rotatable distributor adapted to receive a supply of viscous material and to project said material at different levels in a divided state upon its rotation at centrifuging speed, a plurality of superposed annular plates surrounding said distributor and extending radially outward therefrom and rotatably at the same speed as said distributor, said plates having their surfaces positioned and arranged so as to intercept, receive and continuously give support to the viscous material as it is discharged from the distributor, said plates terminating in a peripheral portion shaped for the discharge of the viscous material.

29. In apparatus for producing fibers and thin material from viscous material, and particularly glass fibers, the combination of a rotatable distributor adapted to receive a supply of viscous material and to project said material at different levels in a divided state upon its rotation at centrifuging speed, and a plurality of curved blades surrounding said distributor and rotating around the rotation axis of said distributor, said blades having their surfaces positioned and arranged so as to intercept, receive and give support to the viscous material as it is projected from the distributor, said blades terminating in a peripheral portion shaped for the discharge of the viscous material.

30. In apparatus for producing fibers and thin material from viscous material, and particularly glass fibers, the combination of a rotatable distributor adapted to receive a supply of viscous material and to project said material at different levels in a divided state upon its rotation at centrifuging speed, and at least one annular plate surrounding said distributor, extending radially outward therefrom and rotatably at the same speed as said distributor, said plate bearing curved blades surrounding said distributor and having their surfaces positioned and arranged so as to intercept, receive and give support to the viscous material as it is projected from the distributor, said blades terminating in a peripheral portion shaped for the discharge of the viscous material.

References Cited in the file of this patent

UNITED STATES PATENTS

| | | |
|---|---|---|
| 2,194,727 | Vello | Mar. 26, 1940 |
| 2,431,205 | Slayter | Nov. 18, 1947 |
| 2,609,566 | Slayter et al. | Sept. 9, 1952 |
| 2,612,654 | O'Connor | Oct. 7, 1952 |
| 2,863,493 | Snow et al. | Dec. 9, 1958 |

FOREIGN PATENTS

| | | |
|---|---|---|
| 205,437 | Australia | Dec. 27, 1956 |
| 1,124,487 | France | July 2, 1956 |